(12) United States Patent
Gopalakrishnan et al.

(10) Patent No.: US 11,286,363 B2
(45) Date of Patent: Mar. 29, 2022

(54) FOAM MATERIAL COMPRISING POLYPHENYLENE SULFIDE POLYMER (PPS)

(71) Applicant: SOLVAY SPECIALTY POLYMERS USA, LLC, Alpharetta, GA (US)

(72) Inventors: Vijay Gopalakrishnan, Dunwoody, GA (US); Jason Rich, Roswell, GA (US); Nan Chen, Cumming, GA (US); Kermit S. Kwan, Cumming, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 346 days.

(21) Appl. No.: 16/498,109

(22) PCT Filed: Mar. 29, 2018

(86) PCT No.: PCT/EP2018/058264
§ 371 (c)(1),
(2) Date: Sep. 26, 2019

(87) PCT Pub. No.: WO2018/178323
PCT Pub. Date: Oct. 4, 2018

(65) Prior Publication Data
US 2021/0102038 A1   Apr. 8, 2021

Related U.S. Application Data

(60) Provisional application No. 62/479,625, filed on Mar. 31, 2017.

(30) Foreign Application Priority Data

May 3, 2017   (EP) .................................... 17169261

(51) Int. Cl.
*C08J 9/00* (2006.01)
*C08J 9/04* (2006.01)
*C08J 9/10* (2006.01)
*C08L 81/02* (2006.01)

(52) U.S. Cl.
CPC ............ *C08J 9/0061* (2013.01); *C08J 9/108* (2013.01); *C08L 81/02* (2013.01); *C08J 2203/04* (2013.01); *C08J 2207/10* (2013.01); *C08J 2381/02* (2013.01); *C08J 2423/06* (2013.01); *C08J 2423/08* (2013.01); *C08J 2423/12* (2013.01); *C08J 2433/08* (2013.01); *C08J 2433/14* (2013.01); *C08L 2203/14* (2013.01); *C08L 2205/24* (2013.01)

(58) Field of Classification Search
CPC ...... C08J 9/0061; C08J 9/103; C08J 2203/04; C08J 2207/10; C08J 2381/02; C08J 2423/06; C08J 2423/08; C08J 2423/12; C08J 2433/08; C08J 2433/14; C08J 2201/024; C08J 2201/03; C08J 2207/00; C08J 2400/26; C08J 9/008; C08L 81/02; C08L 2203/14; C08L 2205/24
See application file for complete search history.

(56) References Cited

U.S. PATENT DOCUMENTS

| | | | |
|---|---|---|---|
| 3,264,272 A | 8/1966 | Rees | |
| 5,114,983 A * | 5/1992 | Stahlke | ............... C08J 9/08 521/134 |
| 2015/0218422 A1* | 8/2015 | Kato | ............... C08J 9/0066 428/355 AC |
| 2015/0315349 A1* | 11/2015 | Tippet | ............... C08K 5/14 521/97 |

FOREIGN PATENT DOCUMENTS

| | | |
|---|---|---|
| JP | 2009155366 A | 7/2009 |
| JP | 2013067735 A | 4/2013 |
| JP | 2013118287 A | 6/2013 |
| WO | 2015097058 A1 | 7/2015 |

OTHER PUBLICATIONS

Murphy J., in "Additives for Plastics Handbook", 2nd Edition, 2001, Chapter 5.2.3., p. 43-48—Elsevier Advanced Technology.
ASTM D1622—Standard Test Method for Apparent Density of Rigid Cellular Plastics, 2014, 4 pages.
McNaught A. D. and Wilkinson A., "Compendium of Chemical Terminology" (the "Gold Book"), 1997, Blackwell Scientific Publications, article "Foam".

* cited by examiner

*Primary Examiner* — Kara B Boyle

(57) ABSTRACT

The invention relates to a foam material (FP) comprising a polymer composition (C) comprising at least a polyphenylene sulfide polymer (PPS) and at least one functionalized elastomer (E). The present invention also relates to a process for the manufacture of said foam material and to an article (A) including said foam material (FP), for example a composite material.

15 Claims, No Drawings

FOAM MATERIAL COMPRISING POLYPHENYLENE SULFIDE POLYMER (PPS)

CROSS-REFERENCE TO RELATED APPLICATIONS

This application is a U.S. national stage entry under 35 U.S.C. 0.5371 of International Application No. PCT/EP2018/058264 filed Mar. 29, 2018, which claims priority to U.S. provisional application No. 62/479,625 filed on Mar. 31, 2017 and to European application No. 17169261.9 filed on May 3, 2017, the whole content of each of these applications being incorporated herein by reference for all purposes.

TECHNICAL FIELD

The present invention relates to a foam material (FP) comprising a polymer composition (C) comprising at least a polyphenylene sulfide polymer (PPS) and at least one elastomer (E). The present invention also relates to a process for the manufacture of said foam material and to an article (A) including said foam material (FP).

BACKGROUND ART

Polyphenylene sulfide polymer (PPS) is a high-performance engineering polymer with superior mechanical properties. However, PPS has a rigid backbone and a high crystallinity, which significantly limit its use in many applications, notably to prepare foam materials.

There is a continuous need, however, for foam materials having improved mechanical properties, so that they can for example be shaped easily and retain their properties over time and at elevated temperatures (e.g. thermal and dimensional stability).

The applicant has identified a foamable polymer composition comprising PPS which resolves the above requirements to be used in various lightweight applications such as transport, insulation and building materials.

The foamable polymer composition of the invention is based on the combination of at least two essential components, i.e. a PPS polymer and a functionalized elastomer. Such a composition allows the preparation of a foam material having a density which is substantially reduced, as well as a higher flexural strain and tensile strain at break, in comparison to foam material obtained from a composition having no elastomer.

U.S. Pat. No. 5,114,983 relates to a PPS structural foam but does not describe however the presence of an elastomer.

JP 2013 118287 relates to a cassette for glass substrates, some parts of which are made of a polyarylene sulphide resin foam.

JP 2013 067735 relates to a foaming agent for polyarylene sulphide resin.

None of these Japanese documents however describes the use of a functionalized elastomer according to the present disclosure, in order to reduce the density, or improve the flexural strain and the tensile strain at break of the foam material obtained therefrom.

SUMMARY OF THE INVENTION

A first aspect of the invention relates to a foam material (FP) comprising a polymer composition (C), which comprises:

at least one polyphenylene sulfide polymer (PPS),
from 1 to 40 wt. % of at least one elastomer,
the wt. % being based on the total weight of (C).

According to this aspect of the invention, the PPS may be defined as a polymer for which at least 50 mol. % of the recurring units of the PPS polymer are recurring units ($R_{PPS}$) of formula (L) (mol. % being based on the total number of moles in the PPS polymer):

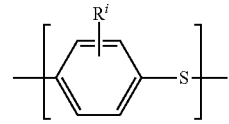

wherein:
each R is independently selected from the group consisting of halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and
i is an integer from 0 to 4.

Such foam material may for example have a density from 200 to 1,200 kg/m³, as measured according to ASTM D1622.

Another aspect of the invention relates to articles (A) including at least a part comprising the foam material (FP), for example composite materials. These articles may for example be selected from the group consisting of an airplane cabin interior component, a medical device, a thermal or acoustic insulation article and a portable electronic device.

Another aspect yet of the present invention relates to a process for the manufacture of the foam material (FP), said process comprising the steps of:

preparing a foamable polymer composition (FC) which comprises in addition to the foam composition components, from 0.01 to 10 wt. % of at least one blowing agent, foaming the foamable polymer composition (FC) using a process selected from the group consisting of a pressure cell process, an autoclave process, an extrusion process, a direct injection process, a blow molding process and bead foaming.

Disclosure of the Invention

The present invention relates to a foam material (FP) comprising a polymer composition (C), which comprises:
at least one polyphenylene sulfide polymer (PPS),
from 1 to 40 wt. % of at least one elastomer (E),
the wt. % being based on the total weight of (C).

The combination of the PPS polymer and the functionalized elastomer, optionally with a nucleating agent, has been found to produce a foam material with a density which is substantially reduced in comparison to foam material obtained from a composition having no elastomer. Such foam material additionally presents improved mechanical properties, notably a higher flexural strain and a higher tensile strain at break, in comparison to the same foam material prepared from a composition not comprising such functionalized elastomer.

Unless otherwise specified, in the context of the present invention the amount of a component in a composition is indicated as the ratio between the weight of the component and the total weight of the composition multiplied by 100 ("wt. %" or "% in weight").

In the context of the present invention, the term "foam" is used with the meaning commonly known to the person skilled in the art. With reference to IUPAC. Compendium of Chemical Terminology, 2nd ed. (the "Gold Book" Compiled by A. D. McNaught and A. Wilkinson. Blackwell Scientific Publications, Oxford 1997, XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook), the term "foam" indicates a dispersion in which a large proportion of gas by volume, in the form of gas bubbles, is dispersed in a liquid, solid or gel. The diameter of the bubbles is usually larger than 1 μm, but the thickness of the lamellae between the bubbles is often in the usual colloidal size range.

As a non-limiting example, at least 20% of the volume of the foam according to the present invention can be occupied by gas, for example at least 25%, at least 30%, at least 35% or at least 40%, based on the total volume of the composition.

The foam material of the present invention comprises a polymer composition (C) which comprises a combination of PPS polymer and functionalized elastomer, and optionally nucleating agent.

The Polyphenylene Sulfide Polymer (PPS)

The polymer composition (C) comprises a polyphenylene sulfide polymer (PPS).

According to the present invention, a "polyphenylene sulfide polymer (PPS)" denotes any polymer of which at least about 50 mol. % of the recurring units are recurring units ($R_{PPS}$) of formula (L) (mol. % are herein based on the total number of moles in the PPS polymer):

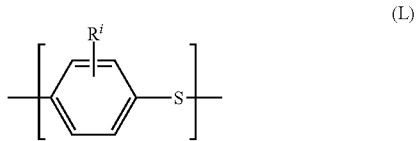

(L)

wherein:
each R is independently selected from the group consisting of hydrogen atoms, halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and
i is an integer from 0 to 4.

In its broadest definition, the polyphenylene sulfide polymer (PPS) of the present invention can be made of substituted and/or unsubstituted phenylene sulfide groups.

According to an embodiment of the present invention, the polyphenylene sulfide polymer (PPS) denotes any polymer of which at least 50 mol. % of the recurring units are recurring units ($R_{PPS}$) of formula (L') wherein $R_1$ is an hydrogen atom:

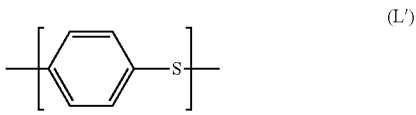

(L')

According to an embodiment of the present invention, the polyphenylene sulfide polymer is such that at least about 60 mol. %, at least about 70 mol. %, at least about 80 mol. %, at least about 90 mol. %, at least about 95 mol. %, at least about 99 mol. % of the recurring units in the PPS are recurring units ($R_{PPS}$) of formula (L) or (L').

The mol. % are based are based on the total number of moles in the PPS.

According to an embodiment of the present invention, the PPS polymer is such that about 100 mol. % of the recurring units are recurring units ($R_{PPS}$) of formula (L) or (L'). According to this embodiment, the PPS polymer consists essentially of recurring units ($R_{PPS}$) of formula (L) or (L').

PPS is notably manufactured and sold under the trade name Ryton® PPS by Solvay Specialty Polymers USA, LLC.

According to the present invention, the melt flow rate (at 316° C. under a weight of 5 kg according to ASTM D1238, procedure B) of the PPS may be from 50 to 400 g/10 min, for example from 60 to 300 g/10 min or from 70 to 200 g/10 min.

According to one embodiment, the melt flow rate (at 316° C. under a weight of 5 kg according to ASTM D1238, procedure B) of the PPS is from 50 to 200 g/10 min, for example from 60 to 150 g/10 min or from 70 to 130 g/10 min.

According to another embodiment, the melt flow rate (at 316° C. under a weight of 5 kg according to ASTM D1238, procedure B) of the PPS is from 100 to 300 g/10 min, for example from 120 to 250 g/10 min or from 140 to 230 g/10 min.

According to an embodiment of the present invention, the polymer composition comprises at least 50 wt. % of PPS, based on the total weight of the polymer composition (C). For example, the polymer composition comprises at least 55 wt. % of PPS, at least 60 wt. % of PPS, at least 65 wt. % of PPS or at least 70 wt. % of PPS.

According to an embodiment of the present invention, the polymer composition comprises less than 99 wt. % of PPS, based on the total weight of the polymer composition (C). For example, the polymer composition comprises less than 98 wt. % of PPS, less than 95 wt. % of PPS, less than 90 wt. % of PPS or less than 85 wt. % of PPS.

According to an embodiment of the present invention, the polymer composition comprises from 50 to 98 wt. % of PPS, based on the total weight of the polymer composition (C). For example, the polymer composition comprises from 52 to 96 wt. % of PPS, from 54 to 94 wt. % of PPS, from 56 to 92 wt. % of PPS or from 58 to 91 wt. % of PPS.

Elastomer(s) (E)

The composition (C) of the present invention comprises from 1 to 40 wt. % of at least one functionalized elastomer.

In the context of the present invention, an "elastomer" is defined as a polymeric material presenting a low glass transition temperature ($T_g$), that-is-to-say a glass transition temperature below 25° C., below 0° C. or even below −25° C.

The functionalized elastomer (E) according to the present invention may be an oligomer or polymer compound, and has functional groups. Functional groups can be incorporated by copolymerizing a functional monomer during polymerization of the elastomer backbone or by grafting of a pre-formed polymer backbone. Functional groups may for example be epoxy groups, anhydride groups, oxazoline groups, maleimide groups or mixture thereof.

The functionalized elastomer (E) of the present invention generally comprises recurring units derived from at least one of the following monomers: ethylene; higher alpha olefins including propylene, butene, octene; dienes, including butadiene and isoprene; acrylates, styrene, acrylonitrile; (meth) acrylic acid and derivatives thereof, including esters; vinyl monomers, including vinyl acetate, and other vinyl esters. Other monomers may be equally comprised in the structure of the elastomer (E).

The polymer backbone of the elastomer (E) can be selected from the group of elastomeric backbones consisting of polyethylenes and copolymers thereof, e.g. ethylene butene; ethylene-octene; polypropylenes and copolymers thereof; polybutenes; polyisoprenes; ethylene-propylene-rubbers (EPR); ethylene-propylene-diene monomer rubbers (EPDM); ethylene-acrylate rubbers; butadiene-acrylonitrile rubbers, ethylene-acrylic acid (EAA), ethylene-vinylacetate (EVA); acrylonitrile-butadiene-styrene rubbers (ABS), block copolymers styrene ethylene butadiene styrene (SEBS); block copolymers styrene butadiene styrene (SBS); coreshell elastomers of methacrylate-butadiene-styrene (MBS) type, or mixture of one or more of the above.

Specific examples of functionalized non-aromatic elastomer according to the present invention are notably terpolymers of ethylene, acrylic ester and glycidyl methacrylate; copolymers of ethylene and butyl ester acrylate; copolymers of ethylene, butyl ester acrylate and glycidyl methacrylate; ethylene-maleic anhydride copolymers; EPR grafted with maleic anhydride; EPDM grafted with maleic anhydride (EPDM-g-MAH) or mixture of one or more of the above. Examples of commercially available functionalized aliphatic elastomers according to the present invention are Exxelor® polymer resins (e.g. Exxelor® VA 1801) from Exxon Mobil, Lotader® polymer resins (e.g. Lotader® AX8840) from Arkema and Elvaloyl® polymer resins from Dupont. Specific examples of commercial elastomeric backbones consisting of ethylene-octene are Engage® polymer resins from Dow.

According to an embodiment of the present invention, the functionalization of the elastomer consists of a maleic anhydride functionalization. An example of a functionalized, non-aromatic elastomer can be EPDM grafted with maleic anhydride (EPDM-g-MAH).

The definition of elastomer according to the definition does also comprise ionomers. Lonomers are organic polymers that contain permanently charged groups such as sulphonic acid groups, carboxylic acid groups, ammonium groups and the like.

Ionomers can be produced by any means known to one skilled in the art, notably by neutralization of an ethylene acid copolymer with one or more metal ions. An ethylene acid copolymer is a polymer that can comprise repeat units derived from ethylene and about 1 to about 50 wt. % of a comonomer such as acrylic acid, methacrylic acid, ethacrylic acid, or combinations of two or more thereof, based on the total weight of the ethylene copolymer. Lonomers are well known to one skilled in the art. Reference can be made to U.S. Pat. No. 3,264,272 which is hereby incorporated by reference.

The elastomer may be present in the composition (C) in a total amount of greater than about 1 wt. %, greater than 2 wt. %, greater than 3 wt. % or greater than 5 wt. %, based on the total weight of the composition (C).

The elastomer may be present in the composition (C) in a total amount of less than about 38 wt. %, less than 36 wt. %, less than 34 wt. %, less than 32 wt. %, less than about 30 wt. %, less than 28 wt. %, less than 26 wt. % or less than 24 wt. % based on the total weight of the polymer composition (C).

According to an embodiment, the polymer composition comprises from 1 to 39 wt. % of elastomer, based on the total weight of the polymer composition (C). For example, the polymer composition comprises from 4 to 35 wt. % of elastomer, from 6 to 31 wt. % of elastomer, from 7 to 29 wt. % of elastomer or from 8 to 27 wt. % of elastomer.

Optional Nucleating Agent(s) (NA)

The composition (C) of the present invention may comprise from 0.01 to 5 wt. % of at least one nucleating agent.

In the context of the present invention, a "nucleating agent" is defined as a component that helps to control the foam structure by providing a site for bubble formation. The nucleating agents of the present invention may also influence other properties of the composition or the foam material obtained therefrom. For example, they may also be added to obtain a selected appearance of the polymer composition by changing the color of reflected or transmitted light as the result of wavelength-selective absorption. Nucleating agents may also impart mechanical reinforcement. In fact, some of the nucleating agents of the present invention will not only act as nucleating agents, helping to create and control the foam structure, but also as pigments, thereby changing the color or the final aspect of the foam material and/or as reinforcing agents, bringing for example improved mechanical properties to the foam material or composite material containing the same.

It is believed that the component hereby called nucleating agent, present in the polymer composition at a content up to 5 wt. %, will primarily act as a nucleating agent, incidentally and optionally bringing other functions to the foam material, such as coloration, pigmentation and reinforcement. Above 5 wt. %, it is believed that said component may act as a filler, notably because of the size of the elemental agent and the overall content present in the composition.

In some embodiments, the polymer composition (C) comprises one or more nucleating agents.

Examples of nucleating agents are glass fibers, carbon fibers, graphite fibers, silicon carbide fibers, aramide fibers, wollastonite, talc, mica, clays, calcium carbonate, potassium titanate, silica, silicate, kaolin, chalk, alumina, aluminate, boron nitride, aluminum oxide, titanium dioxide, zinc sulfide, zinc oxide, magnesium oxide, barium sulfate, carbon black, cobalt phosphate, cobalt titanate, cadmium sulfoselenide, cadmium selenide, copper phthalocyanine, ultramarine, ultramarine violet, zinc ferrite, magnesium ferrite, and iron oxides.

Preferred nucleating agents are glass fibers, talc, calcium carbonate, silica, silicate, boron nitride, titanium dioxide, carbon black, and mixtures thereof.

According to an embodiment, the composition (C) of the present invention comprises from 0.01 to 5 wt. % of at least one nucleating agent which is carbon black. Carbon blacks range widely in physical and chemical properties. Physically, they vary in average particle size, particle size distribution, specific surface area, porosity of surface and the tendency of the individual primary particles to be associated in chain-like structure. Chemically, they vary in the population and nature of oxygenated structures which combine with their surface.

The carbon black employed in the composition (C) of the present invention may have a particle size of less than 200 nm, for example less than 150 nm or less than 100 nm. The particle size of the carbon black particles may for example be in the range from 10 nm to 100 nm, for example from 10 nm to 50 nm. Carbon blacks are classified in ASTM D-1765.

According to another embodiment, the composition (C) of the present invention comprises from 0.01 to 5 wt. % (based on the total weight of the composition) of carbon black, having a particle size in the range from 10 nm to 100 nm, for example from 10 nm to 50 nm as determined according to ASTM D-1765. For example, the composition (C) comprises from 0.05 to 4 wt. % of such carbon black, from 0.1 to 3 wt. % or from 0.2 to 2 wt. %, based on the total weight of the composition (C).

According to another embodiment, the composition (C) of the present invention comprises from 0.01 to 5 wt. % of at least one nucleating agent which is titanium dioxide.

Optional Filler (F)

The composition (C) of the present invention may comprise up to 40 wt. % of at least one filler (F).

By definition, fillers are used to extend a material and to reduce its cost. Fillers may modify the mechanical properties of the final filled foam materials, or composites. Fillers can constitute either a major or a minor part of a foam material. The structure of filler particles ranges from precise geometrical forms, such as spheres, hexagonal plates, or short fibers, to irregular masses. Fillers are generally used for nondecorative purposes, although they may incidentally impart color to a material. Fillers may also impart reinforcements, and a majority of the fillers have reinforcing effects.

According to an embodiment of the present invention, the composition (C) of the present invention comprises up to 40 wt. % of at least one filler (F). To the extent that the selected filler (F) is the same as the selected nucleating agent (NA), the amount of filler is calculated in excess of 5 wt. %. In other words, the amount of filler (F) ranges from 5 to 40 wt. %. For example, if the filler (F) and nucleating agent (NA) are both $TiO_2$, and the total amount of $TiO_2$ in the polymer composition is 6 wt. %, then the amount of $TiO_2$ in the composition (C) as a filler (F) is 6 wt. %–5 wt. %=1 wt. %.

A large selection of fillers, also called sometimes reinforcing fibers or reinforcing agents, may be added to the composition according to the present invention. They can be selected from fibrous and particulate fillers. A fibrous filler is considered herein to be a material having length, width and thickness, wherein the average length is significantly larger than both the width and thickness. Generally, such a material has an aspect ratio, defined as the average ratio between the length and the largest of the width and thickness of at least 5, at least 10, at least 20 or at least 50.

The filler may be selected from mineral fillers (such as talc, mica, kaolin, calcium carbonate, calcium silicate, magnesium carbonate), glass fibers, carbon fibers, synthetic polymeric fibers, aramid fibers, aluminum fibers, titanium fibers, magnesium fibers, boron carbide fibers, rock wool fibers, steel fibers and wollastonite.

Among fibrous fillers, glass fibers are preferred; they include chopped strand A-, E-, C-, D-, S- and R-glass fibers, as described in chapter 5.2.3, p. 43-48 of Additives for Plastics Handbook, 2nd edition, John Murphy. Preferably, the filler is chosen from fibrous fillers. It is more preferably a reinforcing fiber that is able to withstand the high temperature applications.

The reinforcing agents may be present in the composition (C) in a total amount of greater than 5 wt. %, greater than 10 wt. % by weight, greater than 15 wt. % or greater than 20 wt. %, based on the total weight of the polymer composition (C). The reinforcing agents may be present in the composition (C) in a total amount of less than 39 wt. %, less than 35 wt. %, less than 30 wt. % or less than 25 wt. %, based on the total weight of the polymer composition (C).

The reinforcing filler may for example be present in the composition (C) in an amount ranging from 5 to 40 wt. %, from 7 to 37 wt. %, for example from 9 to 36 wt. %, based on the total weight of the polyamide composition (C).

Optional Additives (AD)

The polymer composition (C) may further comprise at least one additive (AD), for example up to 10 wt. % of at least one additive (AD), based on the total weight of the polymer composition (C). The additive can be selected from the group consisting of antioxidant, chemical foaming agent or residues of the same, UV absorber, stabilizers such as light stabilizers, lubricant, plasticizer, anti-static agent, surfactant, metal deactivator and mixtures thereof.

Examples of antioxidants are phosphites, phosphorates, hindered phenols or mixtures thereof.

Surfactants may also be added to help nucleate bubbles and stabilize them during the bubble growth phase of the foaming process.

According to an embodiment, in the foam material (FP) according to the invention, the polymer composition (C) comprises from 0.1 to 9 wt. %, from 0.2 to 5 wt. %, or from 0.5 to 3 wt. % of at least one additive (AD), based on the total weight of (C), selected from the group consisting of antioxidant, chemical foaming agent or residues of the same, UV absorber, stabilizers such as light stabilizers, lubricant, plasticizer, anti-static agent, surfactant, metal deactivator, and mixtures thereof.

In some embodiments, the polymer composition (C) can include more than one additive (AD), for example two or three additives.

According to an embodiment, the composition (C) in the foam material (FP) comprises no other polymeric component than the PPS polymer and the elastomer.

According to another embodiment, the polymer composition (C) in the foam material (FP) consists essentially of at least one PPS polymer, at least one elastomer and at least one nucleating agent, and optionally up to 10 wt. % of at least one additive (AD), based on the total weight of (C). In other words, according to this embodiment, the polymer composition (C) contains no other polymeric component than PPS, or contains other polymeric component(s) in a content of less than 3 wt. %, less than 2 wt. %, less than 1.5 wt. % or less than 1 wt. %. According to this embodiment thought, the polymer composition may comprise one or more PPS polymer according to the present invention. For example, the polymer composition may comprise two distinct PPS polymers, having different molecular weights or melt flow index (MFR), or having different recurring unit compositions according to the definition above.

According to an embodiment of the invention, the polymer composition (C) in the foam material (FP) comprises or consists essentially of the following components (the wt. % being based on the total weight of (C))

at least one polyphenylene sulfide polymer (PPS), from 1 to 40 wt. % of at least one elastomer (E), from 0.01 to 5 wt. % of at least one nucleating agent (NA), optionally up to 40 wt. % of at least one filler (F), optionally up to 10 wt. % of at least one additive (AD), selected from the group consisting of antioxidant, chemical foaming agent or residues of the same, UV absorber, stabilizers such as light stabilizers, lubricant, plasticizer, anti-static agent, surfactant, metal deactivator, and mixtures thereof, the wt. % being based on the total weight of (C), and the sum of the three components (PPS polymer(s), elastomer(s), nucleating agent(s)) or four components (PPS polymer(s), elastomer(s), nucleating agent(s), additive(s)) or five components (PPS polymer(s), elastomer(s), nucleating agent(s), additive(s), filler(s)) equals 100 wt. %.

Foamable Polymer Composition (FC)

While the polymer composition (C), used as an essential part of the foam material (FP) of the present invention, comprises at least a PPS polymer and an elastomer, the foamable polymer composition (FC) further comprises at least one blowing agent. According to the present invention, the foamable polymer composition (FC) thereby comprises:
at least one polyphenylene sulfide polymer (PPS),
from 1 to 40 wt. % of at least one elastomer (E),
from 0.01 to 15 wt. % of at least one blowing agent (BA), the wt. % being based on the total weight of (FC).

According to an embodiment of the present invention, the foamable polymer composition (FC) further comprises from 0.01 to 5 wt. % of at least one nucleating agent (NA).

Blowing Agent (BA)

According to the present invention, a blowing agent, or a blend of blowing agents, can be used in different amounts depending on the desired density of the foam (FP) material. Blowing agent can also be called hereby similarly foaming agent.

According to an embodiment of the present invention, the amount of blowing agent used varies from 0.1 to 10 wt. %, from 0.5 to 5 wt. % or from 1 to 3 wt. %, based on the total weight of the polymer composition (C).

The foaming process may be a chemical or a physical foaming process.

Physical foaming processes use physical blowing agents which refer to compounds which are in the gaseous state under high temperature and high pressure. Physical foaming agents can be fed to the equipment, wherein foaming takes place, either in their gaseous form, or in any other form, from which a gas will be generated via a physical process (e.g. evaporation, desorption). Otherwise, physical foaming agents may be included in the so-called foamable polymer composition (C), to be introduced in the foaming equipment. When physical blowing agent is supplied to a melt, it generates bubbles, for example as the melt passes through the die and is de-pressurized in an extrusion process.

Physical blowing agents can be selected from the group consisting of inert gases, e.g. $CO_2$, nitrogen, argon; hydrocarbons, e.g. propane, butane, pentane, hexane; aliphatic alcohols, e.g. methanol, ethanol, propanol, isopropanol, butanol; aliphatic ketones, e.g. acetone, methyl ethyl ketone; aliphatic esters, e.g. methyl and ethyl acetate; fluorinated hydrocarbons, e.g. 1,1,1,2-tetrafluoroethane (HFC 134a) and difluoroethane (HFC 152a), and mixtures thereof.

Chemical foaming processes use chemical blowing agents, which decompose or react under the influence of the heat used in the process and generate a foaming gas. Chemical blowing agents can be comprised in the foamable composition (FC) thereby generating in situ the foaming gas or can be added during the process of the present invention. Chemical foaming may also be realized in extrusion devices.

Chemical foaming agents can be selected from the group consisting of salts e.g. ammonium or sodium bicarbonate; nitrogen evolving foaming agents, for example aromatic, aliphatic-aromatic and aliphatic azo and diazo compounds, e.g. azodicarbonamide, and sulphonhydrazides, e.g. benzene sulphonhydrazide and oxy-bis(benzenesulphonhydrazide); tetrazole compounds, e.g. compounds selected from the group consisting of formulas (T-1), (T-2), (T-3) and (T-4):

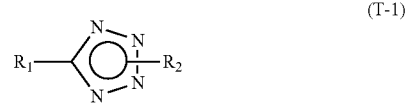
(T-1)

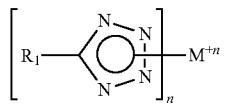
(T-2)

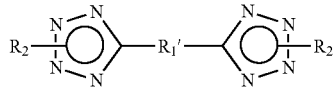
(T-3)

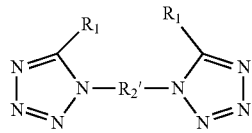
(T-4)

wherein
$R_1$ is selected from a group consisting of alkyl, cycloalkyl, arylalkyl and aryl group,
$R_2$ is selected from a group consisting of hydrogen, alkyl, cycloalkyl, aryl, aralkylene, alkenyl, alkenylaryl and alkenylaralkylene group, optionally substituted,
$R_{1'}$ and $R_{2'}$, are independently selected from a group consisting of a bond and a divalent group optionally comprising one or more heteroatoms, n is an integer equal to 2 or 3,
M is a metal cation selected from the group consisting of barium, calcium, zinc, lead and aluminium.

Tetrazole compounds can notably be selected among the compounds listed in WO 2015/097058 A1, which is incorporated herein by reference in its entirety.

Chemical foaming agents can optionally be mixed with suitable activators, such as for example amines and amides, urea, sulphonhydrazides (which may also act as secondary foaming agent), and the like.

Olefinic Polymer

Chemical foaming agents can optionally be embedded into a carrier which is used to facilitate feeding and dispersion of the chemical foaming agents within the foamable composition. Reference can be made to WO 2015/097058 which is hereby incorporated by reference.

According to an embodiment of the present invention, the foamable polymer composition also comprises an olefinic polymer selected from the group consisting of a high-density polyethylene (HDPE), a linear low-density polyethylene (LLDPE), a low-density polyethylene (LDPE), a very-low-density polyethylene (VLDPE), a propylene homopolymer, a propylene copolymer, a linear homogeneous ethylene/alpha-olefin copolymer and a homogeneous ethylene/alpha-olefin copolymer having long chain branching.

The foam material (FP) is substantially free of the blowing agents. It is however contemplated that residual amounts of the one or more blowing agents may remain in the foam material, although these residual amounts are not sufficient to adversely affect the foam characteristics of the foam material (FP).

According to an embodiment, the foam material (FP) contains less than 0.25 wt. %, less than 0.15 wt. % or less than 0.05 wt. % of blowing agents or residues thereof, based on the total weight of (C).

In alternative embodiments, any of the residual blowing agents may be further reduced by exposing the foam material (FP) to a drying or heat step.

The foam material (FP) of the present invention may be in the form of a panel, a sheet or a film. The foam material (FP) can be manufactured as a sheet or a panel either supported onto a supporting film or sandwiched between two supporting films.

In one embodiment of the present invention, the foam panel has a thickness in the range of from 1 mm to 80 mm, from 3 mm to 60 mm or from 4 mm to 50 mm.

Process for Preparing the Foamable Polymer Composition (FC)

The foamable polymer composition (FC) can be prepared by a variety of methods involving intimate admixing of its essential components (PPS, elastomer, nucleating agent, blowing agent) with any optional additive (AD) and/or additional components useful in the foam preparation process, for example by melt mixing or a combination of dry blending and melt mixing. This process can be carried out in a solids or fine powder mixer. The mixer types usable for this purpose include tumble type mixers, ribbon type mixers, impeller type mixers, also known as high intensity mixers, shaker type mixers, as well as other types of solids and powders mixers known in the art.

The mixture can comprise all of its essential components, and all other optional components, suitable to be directly used in the foaming process, or it can alternatively comprise a part of its essential components, and optional components, to be used as masterbatch and diluted in further amounts of the components in subsequent processing steps.

It is also possible to manufacture the foamable composition (FC) of the invention by further melt compounding the mixture as above described. As said, melt compounding can be realised on all the components or part of them only. Various conventional melt compounding devices, such as co-rotating and counter-rotating extruders, single screw extruders, co-kneaders, disc-pack processors and various other types of extrusion equipment can be used. Extruders, for example twin screw extruders, are preferably used.

Specially designed extruders, i.e. extruders specifically designed to effectively control temperature such that further processes such as foaming is not prematurely initiated and such that the composition may be melted, blended, extruded and pelletized without premature foaming of the composition, are particularly preferred. The design of the compounding screw, e.g. flight pitch and width, clearance, length as well as operating conditions will be advantageously chosen so that sufficient heat and mechanical energy is provided to advantageously fully mix the ingredients as above detailed and advantageously obtain a homogeneous distribution of the different ingredients, but still mild enough to advantageously keep the processing temperature of the composition below that in which foaming may be prematurely initiated, in case optional chemical foaming ingredients are comprised in the composition.

Provided that the processing temperature is kept well above the softening point of the polymer components and below the decomposition temperature of any components possibly present, it is advantageously possible to obtain strand extrudates of the foamable polymer composition (FC) of the invention which have not undergone significant foaming. Such strand extrudates can be chopped by means e.g. of a rotating cutting knife aligned downwards the die plate, generally with an underwater device, which assures perfect cutting knife to die plate alignment, and collected under the form of pellets or beads. Thus, for example the polymer composition (FC) which may be present in the form of pellets or beads, can then be further used for the manufacture of the foam material (FP).

Foam Material (FP) and Process of Preparation

The polymer composition (C) according to the invention is foamed to make a foam material which has a density significantly reduced in comparison to the density of the foamable polymer composition (FC). For example, the density of the foam material is reduced by at least 20%, at least 25% or at least 30%, in comparison to the foamable polymer composition (FC).

According to an embodiment of the present invention, the foam material (FP) has a density of from 200 to 1,200 kg/m$^3$, from 300 to 1,000 kg/m$^3$, from 350 to 950 kg/m$^3$, from 380 to 920 kg/m$^3$, or from 400 to 900 kg/m$^3$. The density can be measured according to ASTM D1622.

According to an embodiment of the present invention, the foam material (FP) presents an average cell size below 1000 μm, below 500 μm, below 300 μm or below 250 μm.

The cell size can be measured using optical or scanning electron microscopy.

Foaming of the polymer composition (C) to obtain the foam material (FP) of the present invention can be performed using any foaming technique. Suitable foaming techniques that may be used in the present invention include, but are not limited to, pressure cell processes, autoclave processes, extrusion processes, blow molding processes, direct injection processes and bead foaming.

A pressure cell process, for example, is carried out batch wise. Typically, the foamable polymer composition (FC) is charged in a pressure cell with a gas under a pressure that is higher than atmospheric pressure and at a temperature that is below the glass transition temperature of the polymer/gas mixture. The system is immersed in a heating bath to raise the temperature above the glass transition temperature and then the gas is decompressed of the mixture to produce the foam (FP) material. Transfer from the pressure cell to the heating bath is generally carried out as fast as possible, considering that the dissolved gas can quickly diffuse out of the polymer at ambient pressure. After foaming, the foam (FP) material is generally quenched in an ethanol/water mixture at about 20° C.

In an autoclave process, for example, the foamable polymer composition (FC) is charged with a gas in an autoclave at a temperature that is above the glass transition temperature of the polymer (P1)/gas mixture and foaming is induced by spontaneous release of the pressure. In contrast to the pressure cell process, in which the gas-charged composition (FC) is normally transferred to a heating bath to raise the temperature to above the glass transition temperature, the autoclave process does not need a heating stage as the polymer is already at the required temperature that is above the glass transition temperature on charging with the gas.

An extrusion process, in contrast to the two techniques described above, is a continuous process. In general, in the extrusion process, the foam (FP) material is formed by melting the foamable polymer composition (FC), which can for example be in the form of pellets or beads, and mixing the so-obtained molten mixture with at least one blowing agent under pressure. At the exit of the extruder, during depressurization, the blowing agent vaporizes and, by absorbing heat of evaporation, rapidly cools the molten mass thereby forming the foam (FP) material.

A blow molding process begins with melting down the foamable polymer composition (FC) and forming it into a parison or in the case of injection and injection stretch blow molding a preform. The parison is a tube-like piece of plastic with a hole in one end through which compressed air can pass. The parison is then clamped into a mold and air is blown into it. The air pressure then pushes the plastic out to match the mold. Once the polymer composition (C) has cooled and hardened, the mold opens up and the part is ejected.

Any suitable extrusion equipment capable of processing foamable polymer composition (FC) can be used for the extrusion. For example, single or multiple-screw extruders can be used, with a tandem extruder being preferred, with a melting extruder and a cooling extruder.

In a specific embodiment, the polymer composition (C) is molten in a primary extruder. The blowing agent is then fed into the primary extruder and mixed into the molten blend under high pressure and temperature in the last sections of the primary extruder. The molten mass is then fed under pressure to a secondary extruder, which is used to cool the material to be foamed and transport it through a die to a calibrator to form the foam (FP) material. The calibrator helps to control the cooling rate and expansion of the foam (FP) material. Therefore, it is beneficial in helping to control the thickness, width and density of the foam (FP) material. The die is operated at a specific temperature range and pressure range to provide the necessary melt strength and to suppress premature foaming in the die. In one embodiment, a single screw extruder is used for both the primary extruder and the secondary extruder. In an alternative embodiment, a twin-screw extruder is used for both the primary extruder and the secondary extruder. In yet another alternative embodiment, a single screw extruder is used for one of the primary extruder or the secondary extruder and a twin-screw extruder is used for the other.

According to an embodiment of the present invention, the foam material (FP) presents:

a flexural strain of at least 5%, as measured according to the D790 ASTM method, for example at least 6%, at least 7% or at least 8%; and/or a tensile strain at break of at least 5%, as measured according to the D638 ASTM method (Type I tensile bars), for example at least 6%, at least 7% or at least 8%.

Articles

Foam materials (FP) according to the present invention are particularly suitable for the preparation of articles (A) selected from the group consisting of an airplane cabin interior component, a medical device, a thermal insulation article (for example for oil and gas piping or for industrial process equipment), an acoustic insulation article and a portable electronic device. These articles may for example be made at least in part of said foam material (FP).

The articles described herein can be formed using techniques well known in the art, including but not limited to, injection molding, blow molding, compression molding, thermoforming and any combination thereof.

In an aspect, the present invention provides a process for the preparation of an article or part of an article, said process comprising the steps of preparing the foamable polymer composition (FC) as described above by blending the components and optional additive (AD), and foaming the polymer composition (C) and then forming the article, or part thereof.

The present invention also relates to the use of a blend comprising:
at least one polyphenylene sulfide polymer (PPS),
from 1 to 40 wt. % of at least one elastomer,
the wt. % being based on the total weight of the polymer blend,
for preparing a foam material (FP).

The present invention also relates to the use of a foamable polymer composition (FC), comprising:
at least one polyphenylene sulfide polymer (PPS),
from 1 to 40 wt. % of at least one elastomer,
from 0.01 to 10 wt. % of at least one blowing agent,
the wt. % being based on the total weight of (C),
for preparing a foam material (FP).

The present invention also relates to the use of a blend or a foamable polymer composition (FC) comprising:
at least one polyphenylene sulfide polymer (PPS), and
from 1 to 40 wt. % of at least one elastomer,
the wt. % being based on the total weight of the polymer blend or foamable polymer composition (FC),
for preparing a foam material (FP) having an improved flexural strain as measured according to the D790 ASTM method, and/or an improved tensile strain at break as measured according to the D638 ASTM method (Type I tensile bars).

The following examples are provided to illustrate practical embodiments of the invention, with no intention to limit its scope.

Should the disclosure of any patents, patent applications, and publications which are incorporated herein by reference conflict with the description of the present application to the extent that it may render a term unclear, the present description shall take precedence.

EXAMPLES

Raw Materials

PPS Ryton® QA200N commercially available from Solvay Specialty Polymers USA, L.L.C.

Elastomer #1: Lotader® AX8840 commercially available from Arkema, copolymer of ethylene and glycidyl methacrylate (epoxy functionalized)

Elastomer #2: Lotader® AX8900 commercially available from Arkema, terpolymer of ethylene, acrylic ester and glycidyl methacrylate (epoxy functionalized)

Elastomer #3: Elvaloy® AS commercially available from Dupont, terpolymer of ethylene, n-butyl acrylate and glycidyl methacrylate (epoxy functionalized)

Carbon Black (particle size: 19 nm, according to ASTM D3849)

Irganox® 1010 commercially available from BASF, an antioxidant 5-phenyltetrazole chemical foaming agent Pro-fax PD702 Polypropylene homopolymer commercially available from LyondellBasell LDPE 5004I, Low Density Polyethylene Resins commercially available from Dow™

General Procedure for the Preparation of the Foam Material (FP)

The different polymer compositions were compounded in ratios according to Table 1, Tables 2-3 and Table 4 below. Compounding into pellets was performed on a 26 mm twin screw extruder (Coperion ZSK-26) having an L/D ratio of 48:1. The base polymer pellets, elastomer(s), nucleating agent(s), filler(s), and additive(s) were fed into the feed throat of the extruder, and the extruder was set at a temperature of 305° C. (581° F.). The die temperature was set at 305° C. (581° F.) and a screw speed of 200 rpm was used along with a throughput rate of 40-50 lb/hr. The extrudate from the extruder in each case was cooled in a water trough and then pelletized. The pellets produced from the formulation were dried at temperatures between 80 and 85° C. (176-185° F.) for 4 hours. The compounded pellets were then dry blended with a masterbatch of 20 wt. % 5-phenyl tetrazole chemical foaming agent in polypropylene. The blend including polymer and foaming agent was fed to a foaming setup.

Two foaming setups were used as described in the examples below.

Example 1

Five compositions according to the invention (Ex1, Ex2, Ex3, Ex4, and Ex5) and one comparative composition (Ex6 C) have been prepared. Their composition weight ratios are reported in Table 1. Each composition was dry blended with a masterbatch of 20 wt. % 5-phenyl tetrazole chemical foaming agent in polypropylene, such that the final concentration of 5-phenyl tetrazole was about 0.09 wt. %.

For examples Ex1-Ex6C, the foaming setup consisted of a 1.5-inch diameter Sterling single screw extruder with 4 heating/cooling zones and with an L/D ratio of 24:1, fitted with a 2 mm×65 mm slit die. The two rear heating zones were set to 282° C. (540° F.) and the two front heating zones were set to 299° C. (570° F.). The die temperature was set to 279° C. (535° F.).

Density (kg/m$^3$)

The density was measured according to the D1622 ASTM method.

The results are reported in Table 1.

TABLE 1

|  | Ex1 | Ex2 | Ex3 | Ex4 | Ex5 | Ex6 C |
|---|---|---|---|---|---|---|
| Composition (wt. %) | | | | | | |
| PPS | 78 | 88 | 89 | 79 | 74 | 99 |
| Lotader ® AX8840 | 20 | 10 | 10 | 20 | 25 | — |
| Carbon Black | 1 | 1 | — | — | — | — |
| Irganox ® | 1 | 1 | 1 | 1 | 1 | 1 |
| Density properties | | | | | | |
| Foam density (kg/m$^3$) | 737 ± 30 | 877 ± 64 | 1070 ± 7 | 1083 ± 10 | 1036 ± 52 | 1300 ± 6 |
| Density Reduction | −41% | −33% | −13% | −8% | −12% | −3% |

The specific compositions of Examples 1, 2, 3, 4, and 5, according to the invention, allow for producing foam materials with a density that is substantially reduced in comparison to foam material obtained from a composition having no elastomer (comparative example 6C). Examples 1 and 2 with carbon black (1 wt. %) show an even better density reduction.

Example 2

Nine compositions according to the invention (Ex7 to Ex15) and six comparative compositions (Ex16C to Ex21C) have been prepared. Their composition weight ratios are reported in Tables 2-3. Each composition was dry blended with a masterbatch of 20 wt. % 5-phenyl tetrazole chemical foaming agent in polypropylene, such that the final concentration of 5-phenyl tetrazole was about 0.4 wt. %. The foaming setup consisted of an Intelli-Torque Plasti-Corder 1.5-mm diameter single screw extruder from C. W. Brabender Instruments, Inc. with an L/D ratio of 40:1. The extruder had 3 barrel heating/cooling zones and 2 die heating zones, and was fitted with a slit die with a 1"×3/32" opening. The rear and middle barrel heating zones were set to 277° C. and the front barrel heating zone was set 280° C. Both die heating zones were set to a temperature of 285° C.

Density (kg/m$^3$)

The density was measured according to the D1622 ASTM method.

Flexural Strain (%)

The flexural strain was measured according to the D790 ASTM method. Test specimens were flexed up to 10% strain or until the specimens broke, whichever occurred first.

Results for the average maximum flexural strain are reported in Tables 2-3. Note that reported flexural strains ≥10.00% indicate that the test resulted in zero broken test specimens for that composition.

TABLE 2

|  | Ex7 | Ex8 | Ex9 | Ex10 | Ex11 | Ex12 | Ex13 | Ex14 |
|---|---|---|---|---|---|---|---|---|
| Composition (wt. %) | | | | | | | | |
| PPS | 89 | 79 | 74 | 89 | 79 | 74 | 89 | 79 |
| Lotader ® AX8840 | 10 | 20 | 25 | — | — | — | — | — |
| Lotader ® AX8900 | — | — | — | 10 | 20 | 25 | — | — |
| Elvaloy AS | — | — | — | — | — | — | 10 | 20 |
| Irganox ® | 1 | 1 | 1 | 1 | 1 | 1 | 1 | 1 |
| Foam properties | | | | | | | | |
| Foam density (kg/m$^3$) | 767 | 806 | 824 | 564 | 852 | 853 | 821 | 858 |
| Max Flexural Strain (%) | 9.04 | 10.01 | 10.01 | 10.00 | 10.01 | 10.01 | 8.11 | 10.00 |

TABLE 3

|  | Ex15 | Ex16C | Ex17C | Ex18C | Ex19C | Ex20C | Ex21C |
|---|---|---|---|---|---|---|---|
| Composition (wt. %) | | | | | | | |
| PPS | 74 | 89 | 79 | 74 | 89 | 79 | 74 |
| Elvaloy AS | 25 | — | — | — | — | — | — |
| Pro-fax | — | 10 | 20 | 25 | — | — | — |
| Irganox ® | 1 | 1 | 1 | 1 | 1 | 1 | 1 |
| 5004I | — | — | — | — | 10 | 20 | 25 |

TABLE 3-continued

| | Ex15 | Ex16C | Ex17C | Ex18C | Ex19C | Ex20C | Ex21C |
|---|---|---|---|---|---|---|---|
| | | | | Foam properties | | | |
| Foam density (kg/m³) | 896 | 710 | 697 | 719 | 756 | 751 | 717 |
| Max Flexural Strain (%) | 10.00 | 3.19 | 3.39 | 2.82 | 3.88 | 3.39 | 3.79 |

Example 3

Three compositions according to the invention (Ex22 to Ex24) and two comparative compositions (Ex25C and Ex26C) have been prepared. Their composition weight ratios are reported in Table 4. Each composition was dry blended with a masterbatch of 20 wt. % 5-phenyl tetrazole chemical foaming agent in polypropylene, such that the final concentration of 5-phenyl tetrazole was about 0.4 wt. %. The foaming setup consisted of an Intelli-Torque Plasti-Corder 1.5-mm diameter single screw extruder from C. W. Brabender Instruments, Inc. with an L/D ratio of 40:1. The extruder had 3 barrel heating/cooling zones and 2 die heating zones, and was fitted with a slit die with a 1"×3/32" opening. The rear and middle barrel heating zones were set to 277° C. and the front barrel heating zone was set 280° C. Both die heating zones were set to a temperature of 285° C.

Density (kg/m³)

The density was measured according to the D1622 ASTM method.

Tensile Strain at Break (%)

The tensile strain at break was measured according to the D638 ASTM method, on ASTM Type I tensile bars.

The results are reported in Table 4 below.

TABLE 4

| | Ex22 | Ex23 | Ex24 | Ex25C | Ex26C |
|---|---|---|---|---|---|
| | | | Composition (wt. %) | | |
| PPS | 74 | 74 | 74 | 74 | 74 |
| AX8840 | 25 | — | — | — | — |
| AX8900 | — | 25 | — | — | — |
| Elvaloy AS | — | — | 25 | — | — |
| Pro-fax 5004I | — | — | — | 25 | — |
| | — | — | — | — | 25 |
| Irganox ® | 1 | 1 | 1 | 1 | 1 |
| | | | Foam properties | | |
| Foam density (kg/m³) | 824 | 853 | 896 | 719 | 717 |
| Tensile strain at break (%) | 10.90 | 18.89 | 10.42 | 1.53 | 2.34 |

The invention claimed is:

1. A foam material (FP) comprising a polymer composition (C), which comprises:
    at least one polyphenylene sulfide polymer (PPS), and
    from 1 to 40 wt. % of at least one functionalized elastomer,
    the wt. % being based on the total weight of (C).

2. The foam material of claim 1, wherein at least 50 mol. % of the recurring units of the PPS polymer are recurring units ($R_{PPS}$) of formula (L) (mol. % being based on the total number of moles in the PPS polymer):

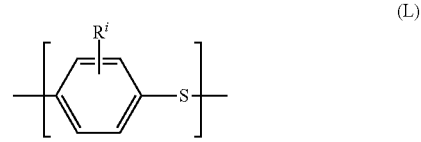

wherein:
    each R is independently selected from the group consisting of halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and
    i is an integer from 0 to 4.

3. The foam material of claim 1, wherein the functionalized elastomer is a non-aromatic elastomer.

4. The foam material of claim 1, wherein the functionalized elastomer is selected from the group consisting of copolymers of ethylene and glycidyl (meth)acrylate; terpolymers of ethylene, acrylic ester and glycidyl (meth)acrylate; copolymers of ethylene and butyl ester acrylate; terpolymers of ethylene, butyl ester acrylate and glycidyl methacrylate; ethylene-maleic anhydride copolymers; ethylene-propylene-rubbers grafted with maleic anhydride (EPR-g-MAH); ethylene-propylene-diene monomer rubbers grafted with maleic anhydride (EPDM-g-MAH) and mixture thereof.

5. The foam material of claim 1, further comprising from 0.01 to 5 wt. % of at least one nucleating agent.

6. The foam material of claim 5, wherein the nucleating agent is selected from the group consisting of glass fibers, talc, calcium carbonate, silica, silicate, boron nitride, titanium dioxide, and carbon black.

7. The foam material of claim 1, wherein the polymer composition further comprises up to 40 wt. % of at least one filler (F).

8. The foam material of claim 1, having a density from 200 to 1,200 kg/m³, as measured according to ASTM D1622.

9. An article (A) including at least a part comprising the foam material (FP) according to claim 1.

10. The article (A) according to claim 9, wherein the article is selected from the group consisting of an airplane cabin interior component, a medical device, a thermal or acoustic insulation article and a portable electronic device.

11. A process for manufacturing a foam material (FP), said process comprising the steps of:
    preparing a foamable polymer composition (FC) which comprises:
        at least one polyphenylene sulfide polymer (PPS),
        from 1 to 40 wt. % of at least one elastomer,
        from 0.01 to 10 wt. % of at least one blowing agent,
    the wt. % being based on the total weight of (C),
    foaming the foamable polymer composition (FC) using a process selected from the group consisting of a pressure cell process, an autoclave process, an extrusion process, direct injection process, blow molding process and bead foaming.

12. The process of claim 11, wherein the blowing agent comprises a tetrazole compound selected from the group consisting of formulas (T-1), (T-2), (T-3) and (T-4):

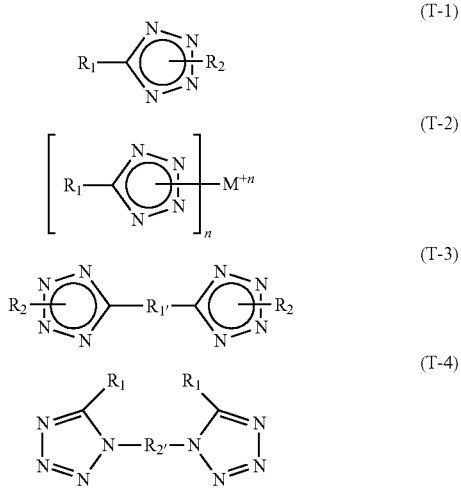

wherein
R$_1$ is selected from a group consisting of alkyl, cycloalkyl, arylalkyl and aryl group,
R$_2$ is selected from a group consisting of hydrogen, alkyl, cycloalkyl, aryl, aralkylene, alkenyl, alkenylaryl and alkenylaralkylene group, optionally substituted,
R$_{1'}$ and R$_{2'}$, are independently selected from a group consisting of a bond and a divalent group optionally comprising one or more heteroatoms, n is an integer equal to 2 or 3, and
M is a metal cation selected from the group consisting of barium, calcium, zinc, lead and aluminium.

13. The process of claim 11, wherein the polymer composition further comprises an olefinic polymer selected from the group consisting of a high-density polyethylene (HDPE), a linear low-density polyethylene (LLDPE), a low-density polyethylene (LDPE), a very-low-density polyethylene (VLDPE), a propylene homopolymer, a propylene copolymer, a linear homogeneous ethylene/alpha-olefin copolymer and a homogeneous ethylene/alpha-olefin copolymer having long chain branching.

14. A foamable polymer composition (FC), comprising:
   at least one polyphenylene sulfide polymer (PPS),
   from 1 to 40 wt. % of at least one elastomer, and
   from 0.01 to 10 wt. % of at least one blowing agent,
   the wt. % being based on the total weight of (C).

15. The foamable polymer composition (FC) of claim 14, further comprising:
   from 0.01 to 5 wt. % of at least one nucleating agent selected from the group consisting of glass fibers, talc, calcium carbonate, silica, silicate, boron nitride, titanium dioxide, and carbon black, and/or
   at least one additive (AD) selected from the group consisting of chemical foaming agent, residues of chemical foaming agent, UV absorber, stabilizer, lubricant, plasticizer, anti-static agents, metal deactivators, and mixtures thereof and/or
   an olefinic polymer selected from the group consisting of a high-density polyethylene (HDPE), a linear low-density polyethylene (LLDPE), a low-density polyethylene (LDPE), a very-low-density polyethylene (VLDPE), a propylene homopolymer, a propylene copolymer, a linear homogeneous ethylene/alpha-olefin copolymer and a homogeneous ethylene/alpha-olefin copolymer having long chain branching.

* * * * *